(12) United States Patent
Sullivan et al.

(10) Patent No.: US 10,883,178 B2
(45) Date of Patent: Jan. 5, 2021

(54) CORROSION MITIGATION FOR GEARBOX

(71) Applicant: Sikorsky Aircraft Corporation, Stratford, CT (US)

(72) Inventors: James Sullivan, Southington, CT (US); Robert Guillemette, Durham, CT (US); Jinkyu Choi, Trumbull, CT (US); Wayne E. Petroskey, East Haven, CT (US); Eric K. Hansen, North Branford, CT (US); Anthony G. Chory, Trumbull, CT (US); Young Hanh Le Do, Westport, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 168 days.

(21) Appl. No.: 16/037,658

(22) Filed: Jul. 17, 2018

(65) Prior Publication Data

US 2018/0327912 A1 Nov. 15, 2018

Related U.S. Application Data (62) Division of application No. 14/073,188, filed on Nov. 6, 2013, now Pat. No. 10,077,499.

(51) Int. Cl.
| | |
|---|---|
| B22F 5/00 | (2006.01) |
| C23C 24/04 | (2006.01) |
| F16H 57/02 | (2012.01) |
| C23C 4/08 | (2016.01) |
| C23C 4/18 | (2006.01) |

(52) U.S. Cl.
CPC ............... *C23C 24/04* (2013.01); *C23C 4/08* (2013.01); *C23C 4/18* (2013.01); *F16H 57/02* (2013.01); *F16H 2057/02017* (2013.01); *Y10T 428/24479* (2015.01)

(58) Field of Classification Search
None
See application file for complete search history.

(56) References Cited

U.S. PATENT DOCUMENTS

| | | | |
|---|---|---|---|
| 2,495,988 | A | 1/1950 | Sheppard |
| 3,711,310 | A | 1/1973 | Leeper |
| 4,141,127 | A | 2/1979 | Cretella et al. |
| 5,302,414 | A | 4/1994 | Alkhimov et al. |
| 6,491,208 | B2 | 12/2002 | James et al. |

(Continued)

FOREIGN PATENT DOCUMENTS

| | | |
|---|---|---|
| EP | 2011964 B1 | 8/2011 |
| EP | 3066232 A2 | 9/2016 |

(Continued)

OTHER PUBLICATIONS

Communication pursuant to Article 94(3) EPC; European Application No. 14879970.3; dated Feb. 18, 2019; 4 Pages.

(Continued)

*Primary Examiner* — Seth Dumbris
(74) *Attorney, Agent, or Firm* — Foley & Lardner LLP (57) ABSTRACT

A magnesium component of a rotary wing aircraft is provided including a groove including a first sidewall and a second sidewall arranged on opposing sides of a recessed opening. The first sidewall includes a deposit positioned adjacent the recessed opening. The deposit is formed by cold spraying one or more layers or powdered material within an area of the first sidewall from which material was removed.

7 Claims, 7 Drawing Sheets

(56) References Cited

U.S. PATENT DOCUMENTS

| | | | |
|---|---|---|---|
| 6,872,425 B2 | 3/2005 | Kaufold et al. | |
| 6,905,728 B1 | 6/2005 | Hu et al. | |
| 7,188,416 B1 | 3/2007 | Woehlke et al. | |
| 7,402,277 B2 | 7/2008 | Ayer et al. | |
| 7,455,881 B2 | 11/2008 | Raybould et al. | |
| 7,648,593 B2 | 1/2010 | Pandey | |
| 7,875,132 B2 | 1/2011 | Pandey | |
| 8,220,124 B1 | 7/2012 | Morasch et al. | |
| 8,231,936 B2 | 7/2012 | Song et al. | |
| 8,597,724 B2 | 12/2013 | Bunting et al. | |
| 9,599,210 B2 | 3/2017 | Hansen et al. | |
| 2005/0163921 A1* | 7/2005 | Looper | B05D 5/005 427/140 |
| 2006/0090593 A1 | 5/2006 | Liu | |
| 2006/0093736 A1 | 5/2006 | Raybould et al. | |
| 2006/0134320 A1 | 6/2006 | Debiccari et al. | |
| 2006/0240192 A1 | 10/2006 | Raybould et al. | |
| 2007/0269608 A1 | 11/2007 | Saito et al. | |
| 2009/0011123 A1 | 1/2009 | Bunting et al. | |
| 2009/0148622 A1 | 6/2009 | Stoltenhoff et al. | |
| 2009/0249603 A1 | 10/2009 | Vargas | |
| 2010/0143700 A1 | 6/2010 | Champagne et al. | |
| 2010/0143746 A1 | 6/2010 | Song et al. | |
| 2010/0155251 A1 | 6/2010 | Bogue et al. | |
| 2011/0030503 A1 | 2/2011 | Ehinger et al. | |
| 2013/0209826 A1 | 8/2013 | Ngo et al. | |
| 2014/0115854 A1 | 5/2014 | Widener et al. | |
| 2014/0263853 A1 | 9/2014 | Jackson | |
| 2015/0063903 A1 | 3/2015 | Matthews et al. | |
| 2015/0122079 A1 | 5/2015 | Hansen et al. | |
| 2015/0125661 A1 | 5/2015 | Sullivan et al. | |
| 2017/0299040 A1 | 10/2017 | Hansen et al. | |

FOREIGN PATENT DOCUMENTS

| | | |
|---|---|---|
| EP | 3066233 A2 | 9/2016 |
| JP | 2008274352 A | 11/2008 |
| WO | 2015112228 A3 | 7/2015 |
| WO | 2015116278 A3 | 8/2015 |

OTHER PUBLICATIONS

Communication pursuant to Article 94(3) EPC; European Application No. 14881323.1; dated Feb. 15, 2019; 6 Pages.

Office Action (with Translation); Japanese Application No. 2016-528216; dated Aug. 21, 2018; 7 Pages.

Office Action (with Translation); Japanese Application No. 2016-528222; dated Aug. 18, 2018; 9 Pages.

Champagne, V.K. et al.; "Magnesium Repair by Cold Spray" U.S. Army Research Laboratory; May 2008; Fig. 2; p. 1, In 11-16, 20-24. Report No. ARL-TR-4438. Obtained online Aug. 3, 2015 URL= http://www.arl.army.mil/www/pages/374/magnesium.pdf.

Communication pursuant to Article 94(3) EPC issued by the European Patent Office for Application No. 14879970.3-1108, dated Jan. 31, 2018 (6 pp.).

Communication Pursuant to Article 94(3) issued by the European Patent Office for Application No. 14881323.1-1108 on Jan. 31, 2018 (4 pp.).

Extended European Search Report for Application No./Patent No. 14879970.3-1362/3066232, dated May 9, 2017 (11 pp.).

Extended European Search Report for Application No./Patent No. 14881323.1-1362/3066233, dated May 16, 2017 (10 pp.).

International Preliminary Report on Patentability for International Application No. PCT/US2014/064259, dated May 10, 2016 (7 pp.).

International Search Report and Written Opinion regarding related PCT Application No. PCT/US14/64264; dated Aug. 27, 2015; 15 pgs.

International Search Report for International Application No. PCT/US14/64259, dated Aug. 21, 2015 (9 pp.).

PCT Invitation to Pay Addtional Fees and, Where applicable, protest fee; International Application No. PCT/US14/64259; International Filing Date: Nov. 6, 2014; dated Jun. 29, 2015; pp. 1-2.

Written Opinion of the International Searching Authority for International Application No. PCT/US14/64259 dated Aug. 10, 2015; dated Aug. 21, 2015; 6 pages.

Notification of Transmittal of the International Search Report for the International Application No. PCT/US14/64259 dated Aug. 10, 2015; dated Aug. 21, 2015; 9 pages.

PCT International Preliminary Report on Patentability; International Application No. PCT/US20141064264; International Filing Date: Nov. 6, 2014; dated May 10, 2016; pp. 1-6.

PCT Invitation to Pay Additional Fees and, where applicable, protest fee; International Application No. PCT/US14/64264; International Filing Date: Nov. 6, 2014; dated Jun. 29, 2015; pp. 1-2.

U.S. Non-Final Office Action; U.S. Appl. No. 15/427,537; Application Filing Date: Feb. 8, 2017; dated May 24, 2019; 27 pages.

* cited by examiner

CORROSION MITIGATION FOR GEARBOX

CROSS-REFERENCE TO RELATED APPLICATIONS

This application is a divisional of U.S. application Ser. No. 14/073,188, filed Nov. 6, 2013, which is incorporated herein by reference in its entirety.

BACKGROUND OF THE INVENTION

Exemplary embodiments of the invention relate to components of a rotary-wing aircraft susceptible to corrosion damage and, more particularly, to a method for preventing or reducing corrosion damage to such a component of a rotary-wing aircraft.

A rotary-wing aircraft includes components, such as gearboxes for example, typically constructed from aluminum and magnesium alloys. As a result of exposure of such components to the environment, these alloy materials are susceptible to corrosion. For example, the presence of water or moisture on the outer surface of the component may cause corrosion and other environmental conditions, such as chemical fallout and saltwater for example, may exacerbate corrosion. Corrosion causes the material of the component to deteriorate, thereby reducing the wall thickness thereof. In some instances, the component's wall thickness may be excessively reduced such that the structural integrity of the component is compromised.

Conventional rotary-wing aircraft component repair methods allow for dimensional restoration of aluminum and magnesium structures using a variety of techniques including, but not limited to, epoxy bonding, plasma spray, high velocity oxygen fuel (HVOF) thermal spray and fusion welding for example. High temperature repair techniques may result in unacceptable component distortion and degrade the substrate material properties by over-aging or solutioning. Epoxy bonding can break or spall during service, allowing the environmental elements to attack the underlying material. Subsequent attacks on the material will deteriorate wall thickness such that the component is no longer usable.

BRIEF DESCRIPTION OF THE INVENTION

According to one embodiment of the invention, a magnesium component of a rotary wing aircraft is provided including a groove including a first sidewall and a second sidewall arranged on opposing sides of a recessed opening. The first sidewall includes a deposit positioned adjacent the recessed opening. The deposit is formed by cold spraying one or more layers of powdered material within an area of the first sidewall from which material was removed.

According to another embodiment of the invention, a method of rebuilding a damaged portion of a groove in a magnesium component is provided including forming an area in a sidewall adjacent the recessed opening by removing all material exhibiting wear or localized corrosion and pitting. A deposit is created in the area and is integrally formed with the sidewall and an inner surface of a recessed opening of the groove. Excess material is removed as needed, from the deposit.

According to another embodiment of the invention, a method of preemptively forming a deposit in a groove of a magnesium component is provided including removing material from a sidewall adjacent a recessed opening of the groove to form an area. Damage is expected to occur in the area from which the material is to be removed. A deposit is formed in the area. The deposit is integrally formed with the sidewall and an inner surface of the recessed opening. Excess material is removed as needed, from the deposit.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
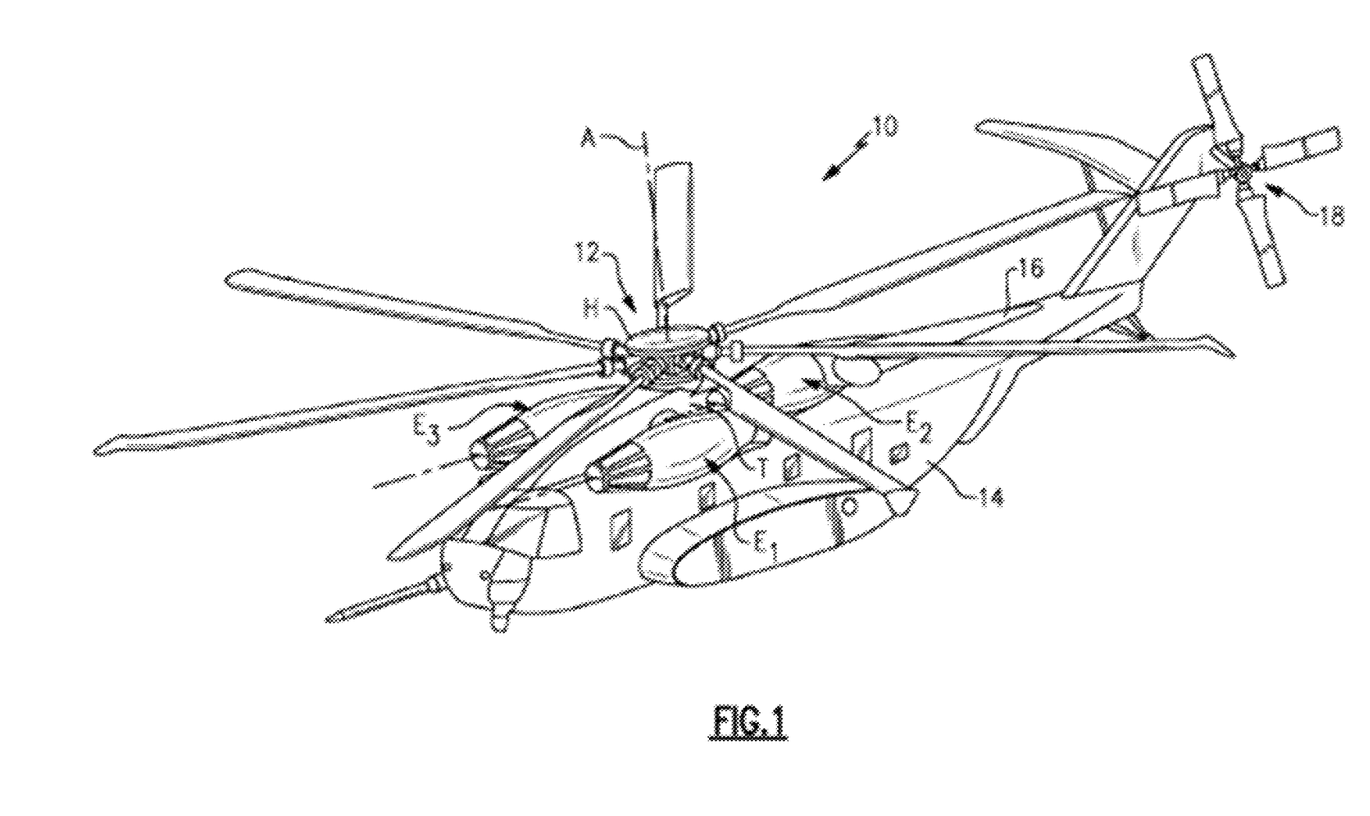
FIG. 1 is a perspective view of an exemplary rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system, a translational thrust system, a pusher propeller, or a rotor propulsion system for example. Power is transferred from one or more engines E to a power transmission gearbox 20 (see FIGS. 2a and 2b), to drive the main rotor system 12 about a respective axis of rotation A. Although a particular rotary wing aircraft configuration is illustrated and described in the disclosed embodiment, other configurations and/or machines, such as a high speed compound rotary wing aircraft with supplemental translational thrust systems, a dual contra-rotating, coaxial rotor system aircraft, and a turbo-prop, tilt-rotor or tilt-wing aircraft for example, will also benefit from the present invention.

Figure 2A:
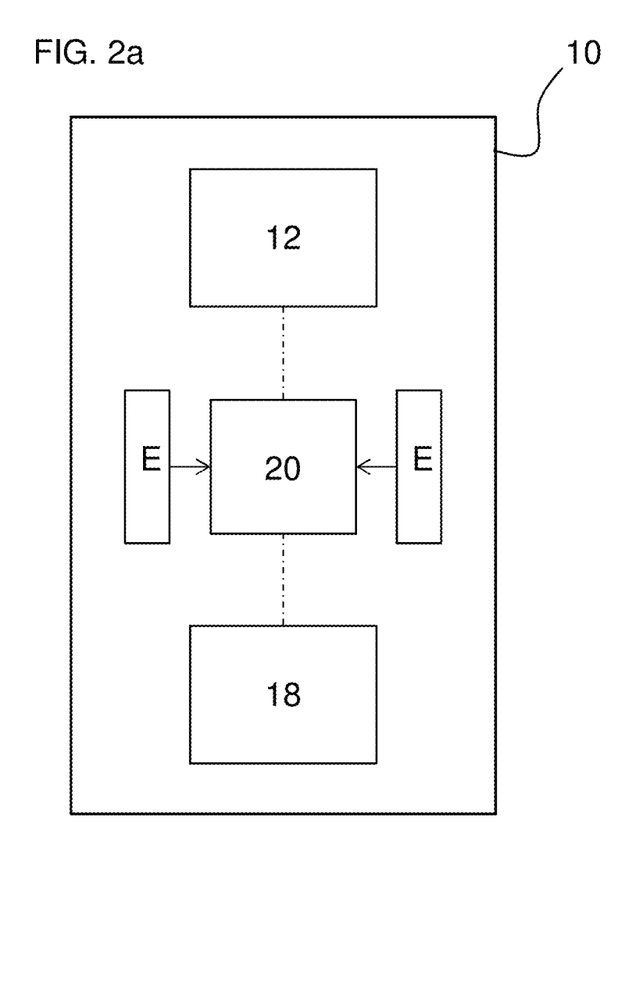
FIGS. 2a and 2b are exemplary schematic diagrams of the main rotor system and the tail rotor system of the aircraft of FIG. 1.
Figure 2B:
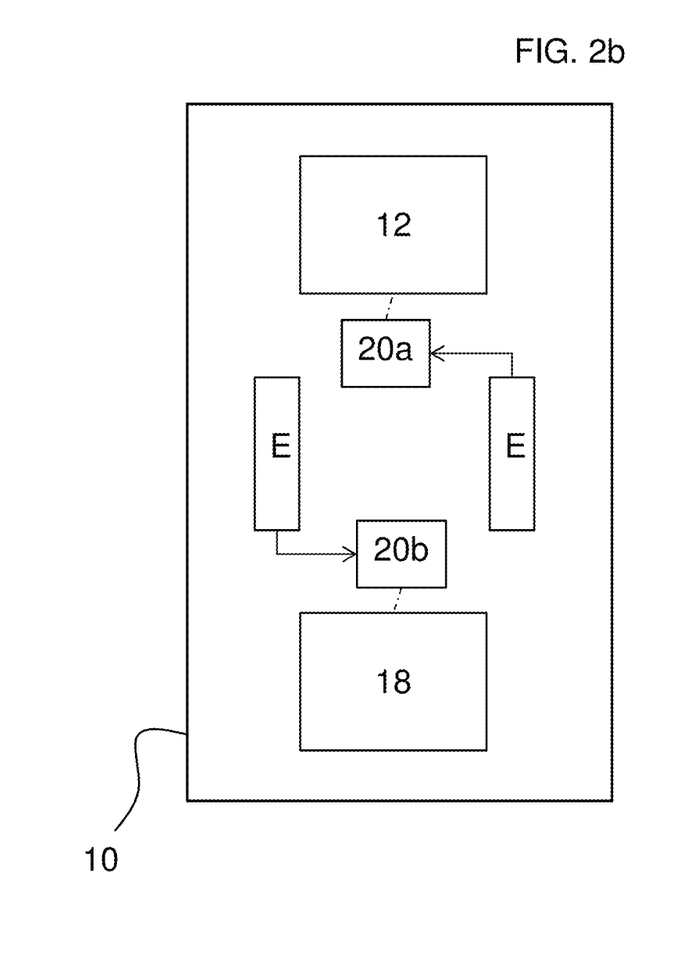

Referring now to FIG. 2a, a schematic diagram of the main rotor system 12 and the tail rotor system 18 of the aircraft 10 of FIG. 1 is provided in more detail. In the illustrated non-limiting embodiment, the power transmission gearbox 20 is interposed between one or more engines E, the main rotor system 12 and the tail rotor system 18. The gearbox 20 may be mechanically connected to and configured to operate both the main rotor system 12 and the tail rotor system 18. In another embodiment, shown in FIG. 2b, the rotary wing aircraft 10 includes a first power transmission gearbox 20a mechanically coupled to and configured to operate the main rotor system 12. Similarly, a second power transmission gearbox 20b is mechanically connected to and configured to operate the tail rotor system 18. Each of the power transmission gearboxes 20a, 20b receives power from at least one engine E of the aircraft 10.

Figure 3:
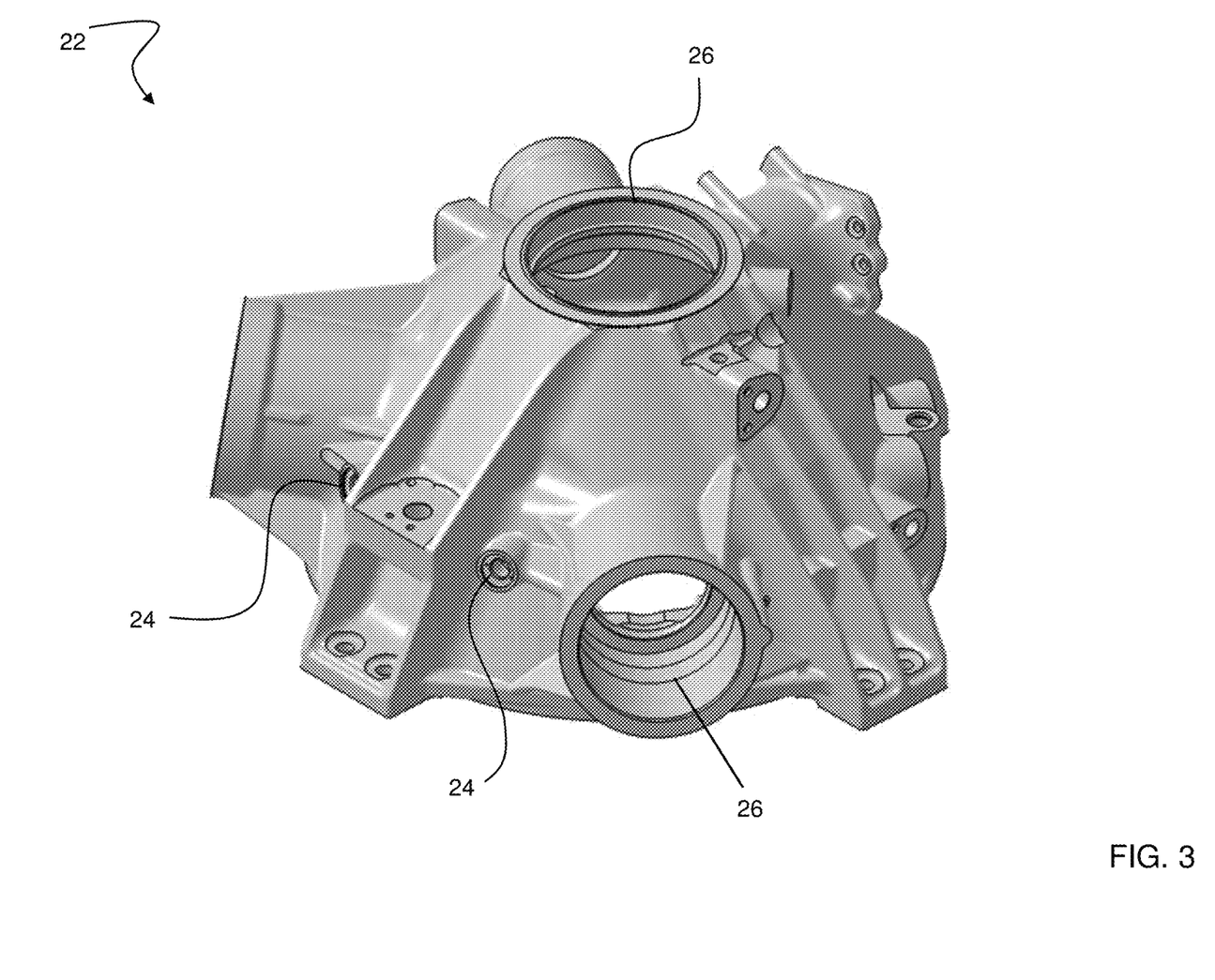
FIG. 3 is a perspective view of a gearbox housing of a rotary wing aircraft according to an embodiment of the invention.

Each power transmission gearbox 20 is generally mounted within a housing 22 (see FIG. 3) configured to support the gear-train therein. In one embodiment, the gearbox housing 22 includes a magnesium material. In the illustrated, non-limiting embodiment, the housing 22 generally includes a plurality of first openings 24 and a plurality of second openings 26. The plurality of first openings 24 may be configured to provide a plurality of passageways for a lubricant to various portions of the gearbox 20 for example. The plurality of second openings 26 may be configured to at least partially support an input module attachment (not shown), such as the rotor shaft (not shown) of the main rotor system 12 or the tail rotor system 18 for example. Although a particular gearbox housing 22 configuration is illustrated and described in the disclosed non-limiting embodiment, other configurations are within the scope of the invention.

Figure 4:
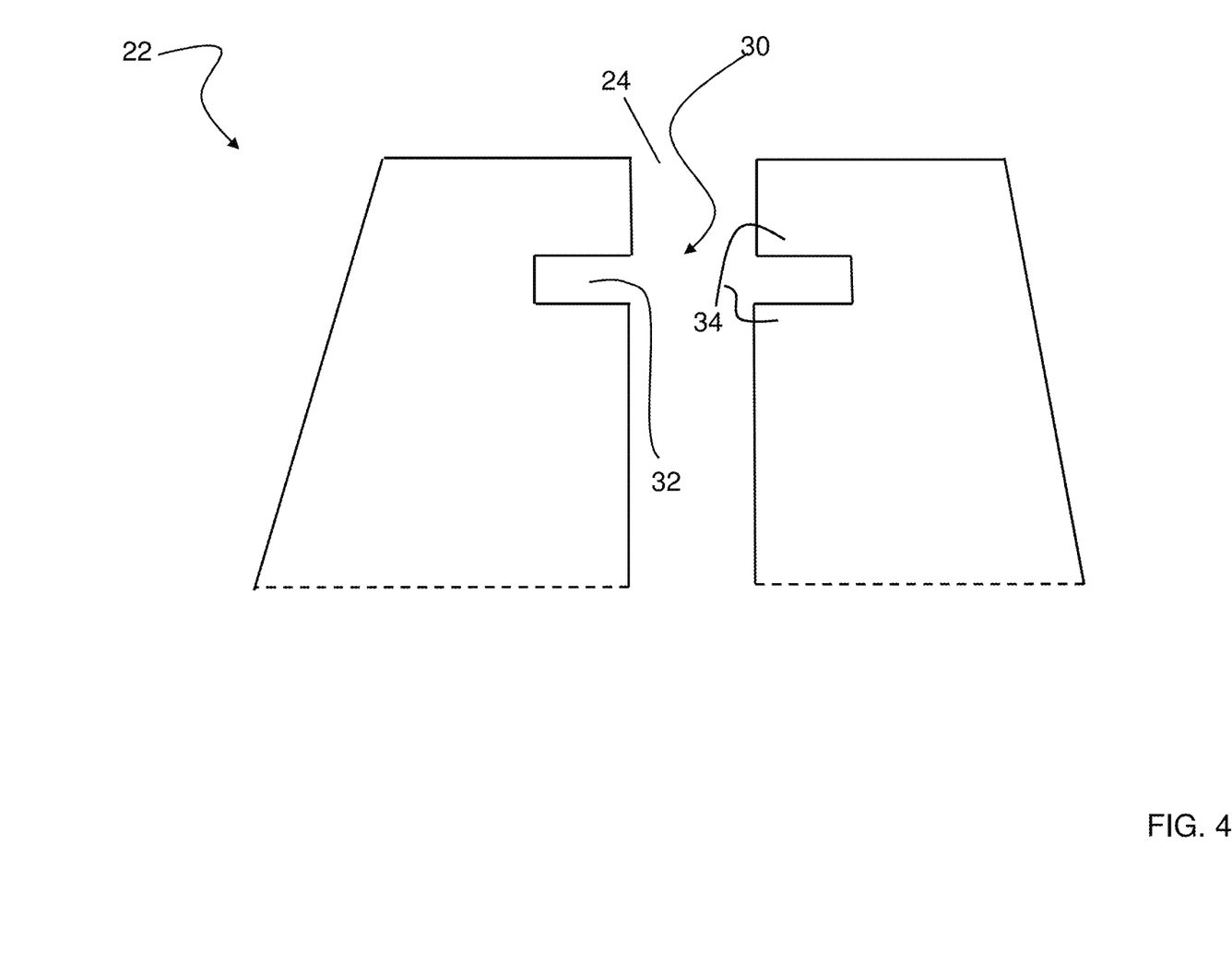
FIG. 4 is a cross-sectional view of a portion of the gearbox housing illustrated in FIG. 3 including a groove.

The gearbox housing 22 additionally includes one or more grooves 30, as illustrated in FIG. 4, having a recessed opening 32 surrounded on opposing sides by a similar first and second sidewall 34. Each groove 30 is configured to receive a component, such as an o-ring seal for example. In one embodiment, the plurality of grooves 30 are arranged within one or more of the plurality of first openings 24 or the plurality of second openings 26, as illustrated in FIG. 4, such that the sidewalls 34 are formed by the housing 22. However, the grooves 30 may be formed in any portion of the gearbox housing 22.

Figure 5:
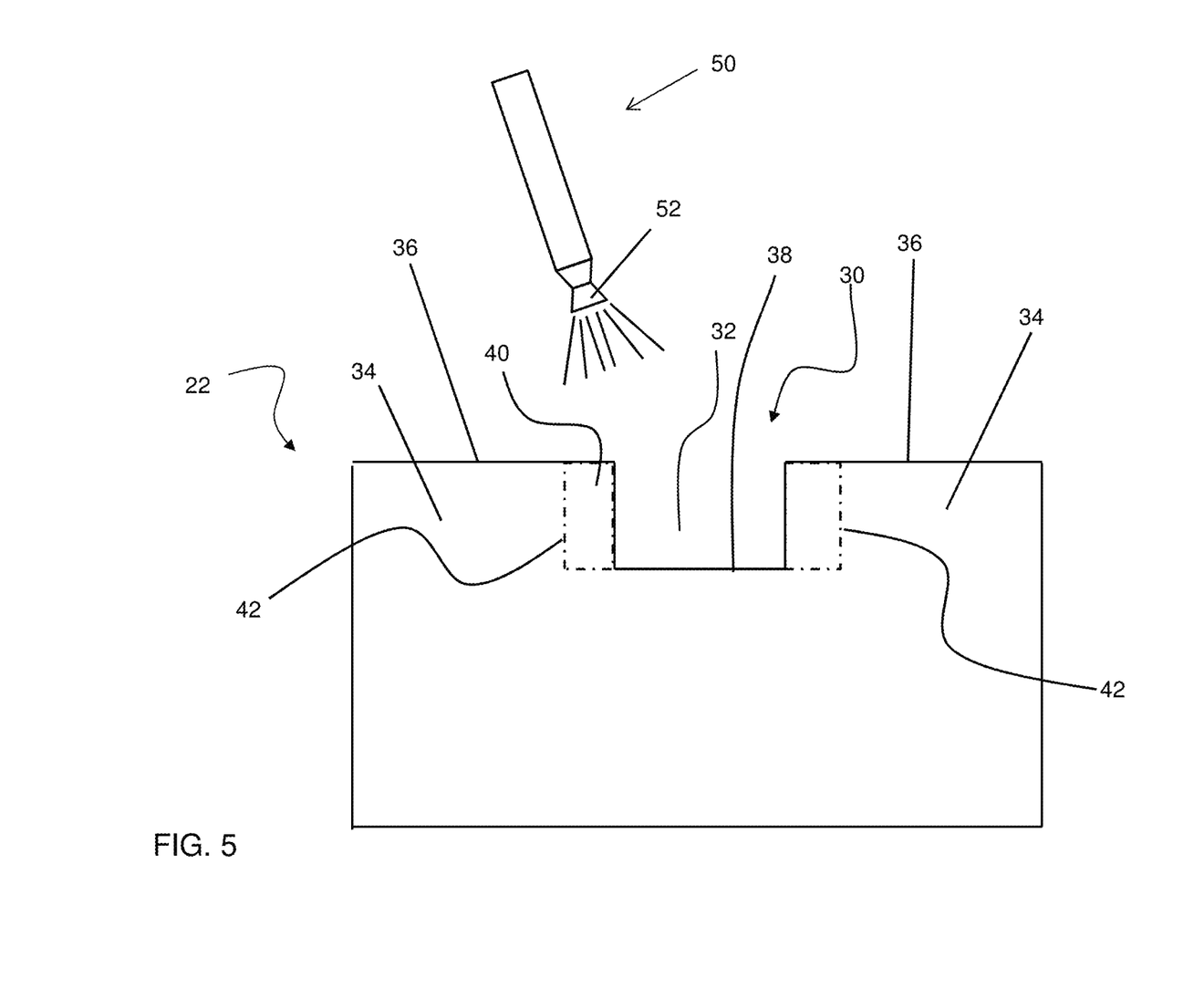
FIG. 5 is a cross-sectional view of a portion of a gearbox housing having an integrally formed deposit according to an embodiment of the invention.

Portions of the housing, in particular the sidewalls 34 of the grooves 30 are highly susceptible to wear, as well as to corrosion and/or pitting. Referring now to FIG. 5, a deposit 40, illustrated as a shaded region, forms at least a portion of one or more of the sidewalls 34 of a groove 30 in the gearbox housing 22. The deposit 40 may be formed from any suitable powdered material known in the art, such as aluminum or aluminum alloy for example. In one embodiment, the deposit 40 is formed as a means of repairing the housing 22 after wear or corrosion and pitting has already occurred. In another embodiment, the deposit 40 is formed as a "preemptive repair" based on a determination of where damage to the sidewall 34 is most likely to occur.

Each deposit 40 is formed by applying one or more layers of powdered material to an area 42 of the sidewall 34 adjacent the recessed opening 32. In embodiments where the deposit 40 is applied to the housing 22 after damage has occurred, the area 42 is formed by removing the damaged material from the sidewall 34. In one embodiment, the material removed to form area 42 extends from the inner surface 38 of the recessed opening 32 to the outer surface 36 of the sidewall 34 and has a depth sufficient to completely eliminate all of the localized damage or corrosion. Some of the adjacent non-compromised material of the sidewall 34 may additionally be removed along with the damaged material to ensure that the remaining material of the sidewall 34 has not been compromised. In embodiments where the deposit 40 is applied "preemptively," each area 42 is created by removing material from the sidewall 34 where damage and/or corrosion and pitting are most likely to occur.

The layers of powdered material used to form the deposit 40 are generally applied through a deposition process that provides sufficient energy to accelerate the particles to a high enough velocity such that the particles plastically deform and bond to the area 42 upon impact. The particles of the powered material are accelerated through a converging/diverging nozzle 52 of a spray gun 50 to supersonic velocities using a pressurized or compressed gas, such as helium, nitrogen, other inert gases, or mixtures thereof. The deposition process does not metallurgically transform the particles from their solid state. Various techniques may be used to achieve this type of particle deposition, including but not limited to, cold spray deposition, kinetic metallization, electromagnetic particle acceleration, modified high velocity air fuel spraying, or high velocity impact fusion (HVIF) for example.

The layers of powered material may be applied to the original material of the housing 22, or alternatively, may be applied to a previously formed deposit 40. During deposition of the powdered material, the gearbox housing 22 may be held stationary or may be articulated or translated by any suitable means (not shown) known in the art. Alternatively, the nozzle 52 of the spray gun 50 may be held stationary or may be articulated or translated. In some instances, both the gearbox housing 22 and the nozzle 52 may be manipulated, either sequentially or simultaneously.

Figure 6:
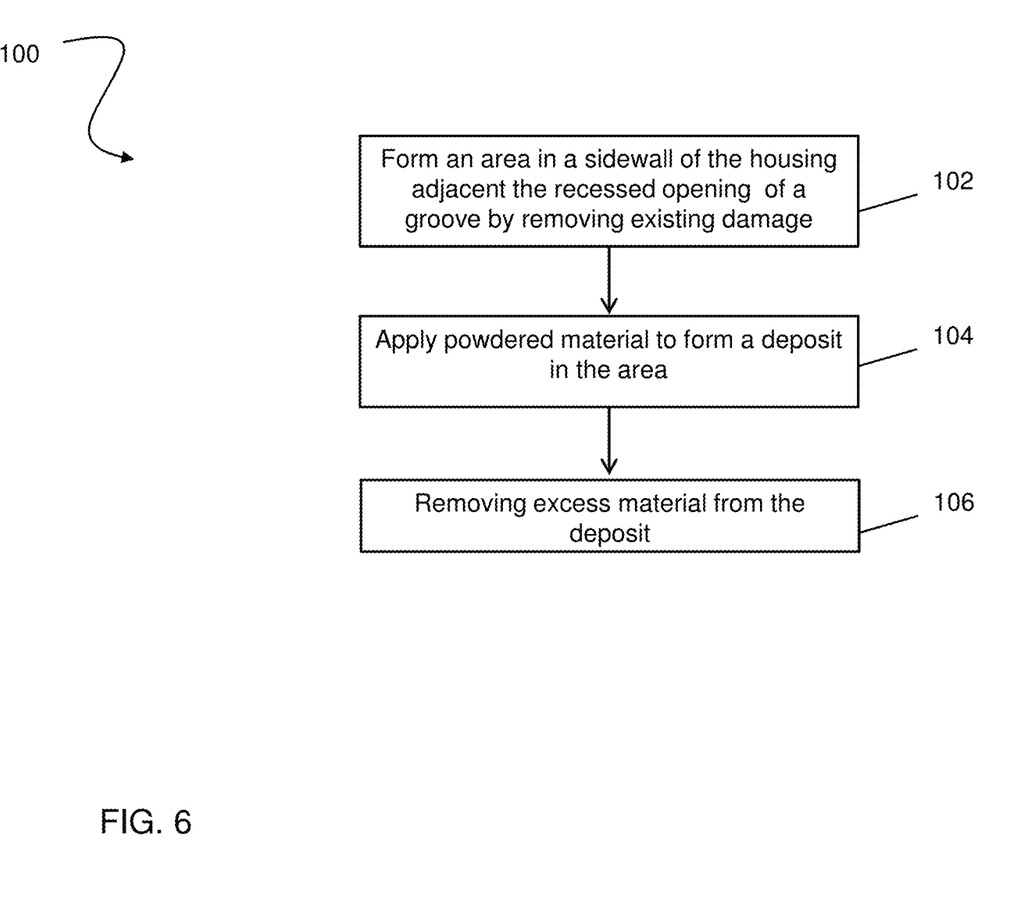
FIG. 6 is a method for rebuilding a portion of a groove of a gearbox housing according to an embodiment of the invention.

A method 100 for rebuilding a damaged portion of a groove 30 of a gearbox housing 22 is illustrated in FIG. 6. The method begins in block 102 by removing all of the localized damage from at least one of the sidewalls 34 of the groove 30 to form an area 42 (see FIG. 5). The corrosion and pitting may be removed either mechanically or chemically, for example using grinding, machining, etching, or other applicable techniques. In block 104, at least one layer of powdered material is applied to the area 42 using a cold spray deposition process to create a deposit 40 integrally formed with the inner surface 38 of the recessed opening 32 and the remainder of the sidewall 34. When bonded to the area 42, the deposit 40 may extend beyond the original dimensions of the sidewall 34 of the gearbox housing 22. After formation of the deposit 40, excess material is removed as necessary, as shown in block 106. As a result, the deposit 40 is generally flush with the remainder of the sidewall 34 of the gearbox housing 22 and/or the dimension of the gearbox housing 22 including the deposit 40 is substantially equal to the original dimension thereof.

Figure 7:
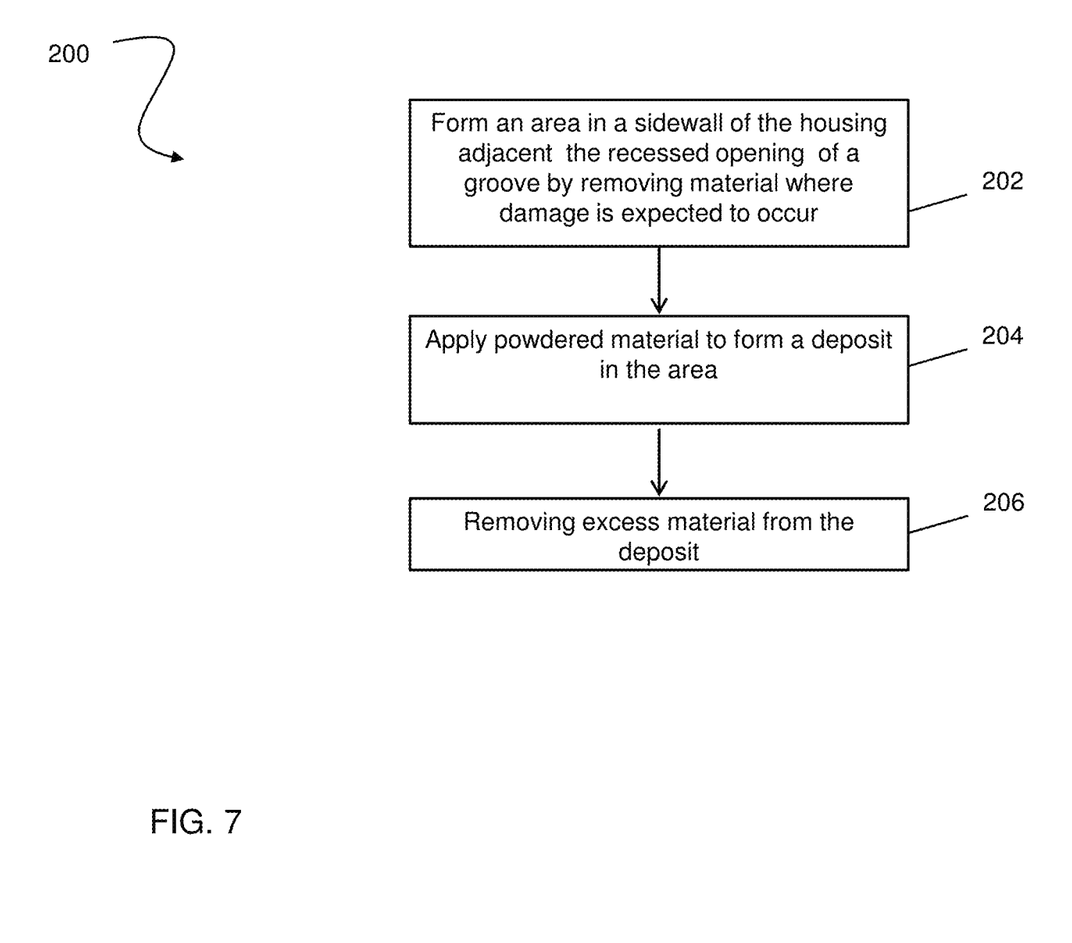
FIG. 7 is a method for preemptively forming a deposit in a groove of a gearbox housing according to an embodiment of the invention.

A method 200 of preemptively forming a deposit 40 in a sidewall of a housing 22 is illustrated in FIG. 7. The method 200 begins in block 202 by removing some material from the sidewall 34 of an unused gearbox housing 22, at a position where localized corrosion and pitting is most likely to occur, to form an area 42. Material may be removed from the sidewall 34 either mechanically or chemically, for example using grinding, machining, etching, or other applicable techniques. In block 204, at least one layer of powdered material is applied using a cold spray deposition process to form a deposit 40. The deposit 40 formed within the area 42 of the sidewall 34 may extend beyond the original dimension of the surface 30 of the gearbox housing 22. In such instances, excess material is removed after formation of the deposit 40, as shown in block 206. The excess material 40 may be removed so that the deposit 40 is substantially flush with the remainder of the sidewall 34 of the gearbox housing 22 and/or so that the dimension of the gearbox housing 22 including the deposit 40 is generally equal to the original dimension thereof.

Formation of one or more deposits 40 in the sidewalls 34 of one or more grooves 30 in a gearbox housing 22 can reduce and/or prevent corrosion and pitting, thereby improving the life of the housing 22. In addition, use of a cold spray deposition process will not affect the heat treatment condition of the magnesium substrate and its material properties, a consideration which normally limits the availability of repairs of magnesium components.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A magnesium component of a rotary wing aircraft comprising:
    a groove including a recessed opening located within a central portion of the groove and a first sidewall and a second sidewall arranged on opposing sides of the recessed opening, wherein the first sidewall includes an area from which material of the first sidewall was removed, wherein the area extends to the recessed opening; and
    a deposit arranged within the area adjacent the recessed opening, the deposit being integrally formed with the first sidewall by cold spraying one or more layers of powdered material within the area of the first sidewall from which material of the first sidewall was removed, wherein the deposit is substantially identical in size and shape to the area from which material of the first sidewall was removed.

2. The magnesium component according to claim 1, wherein the magnesium component is a gearbox housing.

3. The magnesium component according to claim 1, wherein the powdered material includes aluminum.

4. The magnesium component according to claim 1, wherein damage is expected to occur to the area of the sidewall where the deposit is located.

5. The magnesium component according to claim 1, wherein the deposit extends from an inner surface of the recessed opening to an outer surface of the sidewall.

6. The magnesium component according to claim 1, wherein the magnesium component including the deposit has at least one dimension substantially equal to an original dimension of the magnesium component.

7. The magnesium component according to claim 6, wherein the deposit is substantially flush with a remainder of the sidewall.

* * * * *